US009952884B1

(12) United States Patent
Gschwind et al.

(10) Patent No.: US 9,952,884 B1
(45) Date of Patent: *Apr. 24, 2018

(54) EXECUTING OPTIMIZED LOCAL ENTRY POINTS AND FUNCTION CALL SITES

(71) Applicant: International Business Machines Corporation, Armonk, NY (US)

(72) Inventors: Michael Karl Gschwind, Chappaqua, NY (US); Ulrich Weigand, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/420,392

(22) Filed: Jan. 31, 2017

Related U.S. Application Data

(63) Continuation of application No. 15/332,719, filed on Oct. 24, 2016.

(51) Int. Cl.
*G06F 9/445* (2006.01)
*G06F 9/44* (2006.01)
*G06F 9/54* (2006.01)

(52) U.S. Cl.
CPC ............ *G06F 9/44521* (2013.01); *G06F 9/54* (2013.01)

(58) Field of Classification Search
CPC ........................................................ G06F 8/54
USPC ......................................................... 717/166
See application file for complete search history.

(56) References Cited

U.S. PATENT DOCUMENTS 5,097,533 A * 3/1992 Burger ...................... G06F 8/76 712/E9.082
6,427,234 B1 * 7/2002 Chambers ........... G06F 9/45516 717/140
8,448,022 B1 5/2013 Scott
8,468,552 B2 6/2013 Brown
8,583,939 B2 * 11/2013 Lee ....................... G06F 9/4426 713/190

(Continued)

FOREIGN PATENT DOCUMENTS

CN 100517249 7/2009
CN 102012991 4/2011

OTHER PUBLICATIONS

Debray et al., "Compiler Techniques for Code Compaction", ACM, 2000, 38pg.*
Moser et al. "Limits of Static Analysis for Malware Detection", IEEE, 2007, 10pg.*
Rajagopalan et al., "Binary Rewriting of an Operating System Kernel", Proc. Workshop on Binary Instrumentation and Applications, 2006, 8pg.*

(Continued)

*Primary Examiner* — Ryan Coyer
(74) *Attorney, Agent, or Firm* — Lieberman & Brandsdorfer, LLC

(57) ABSTRACT

Embodiments relate to optimizing an indirect call function. More specifically, an indirect call function configuration comprises a first application module having a target function of the indirect function call, a second application module with a symbolic reference to the target function of the indirect function call, and a third application module to originate an indirect function call. A compiler identifies potential target functions and indicates the potential target functions in the program code. Additionally, the compiler determines and indicates in the program code that the function pointer value resulting from a non-call reference of a function symbol is solely used to perform indirect calls in the same module. A linker can read the indication the compiler made in the program code and optimize the indirect call function.

8 Claims, 16 Drawing Sheets

(56) References Cited

U.S. PATENT DOCUMENTS

| | | | |
|---|---|---|---|
| 8,627,291 B2 | 1/2014 | Dawson et al. | |
| 9,021,511 B1 | 4/2015 | Gschwind | |
| 9,063,759 B2 | 6/2015 | Gschwind | |
| 9,218,168 B1 | 12/2015 | Gschwind et al. | |
| 9,250,881 B1 | 2/2016 | Gschwind et al. | |
| 9,329,875 B2 | 5/2016 | Gschwind et al. | |
| 9,348,616 B2 | 5/2016 | Gschwind et al. | |
| 2010/0192026 A1 | 7/2010 | Abadi et al. | |
| 2015/0294113 A1 | 10/2015 | Troeger et al. | |
| 2015/0309810 A1 | 10/2015 | Gschwind et al. | |
| 2015/0309812 A1* | 10/2015 | Gschwind | G06F 9/44521 717/140 |

OTHER PUBLICATIONS

Jose et al., Cause Clue Clauses: Error Localization using Maximum Satisfiability, University of California, Los Angeles, 2011, pp. 1-10.

Bartlett; Assembly Language for Power Architecture, Part 4: Function Calls and the PowerPC 64-Bit ABI, Feb. 28, 2007, http://www.ibm.com/developerworks/library/l-powasm4/.

Lin et al., Improve the Performance of Function Calls with Open Power ABI, Anatomy of Function Calls with OpenPower ABI Supplement, Jul. 10, 2015, ibm.com/developerWorks/.

Ho et al., Optimizing the Performance of Dynamically-Linked Programs, Silicon Graphics, Inc., USENIX, 1995.

List of IBM Patents or Applications Treated as Related, Jan. 2017.

* cited by examiner

EXECUTING OPTIMIZED LOCAL ENTRY POINTS AND FUNCTION CALL SITES

CROSS-REFERENCE TO RELATED APPLICATION(S)

This application is a continuation patent application of U.S. patent application Ser. No. 15/332,719, filed Oct. 24, 2016, titled "Executing Optimized Local Entry Points and Function Call Sites", which is hereby incorporated by reference.

BACKGROUND

The present embodiments relate to generally to computer systems and global and local entry points for a callee function and optimization of a caller function. More specifically, the embodiments relate to allowing use of the local entry point with an indirect function call.

In computer software, an application binary interface (ABI) describes the low-level interface between an application module and the operating system or between the application module and another application module. The ABI covers details such as data type, size, and alignment; the calling conventions which control how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allows a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program and loading of the shared libraries for application startup occurs before the application is executed on a particular hardware platform.

The compiler works on a single source file (compile unit) at a time to generate object files. The compiler generates object code without knowing the final address or displacement of the code/data. Specifically, the compiler generates object code that will access a table of contents (TOC) for variable values without knowing the final size of the TOC or offsets/addresses of various data sections. Placeholders for this information are left in the object code and updated by the linker. A TOC is a variable address reference table that is utilized, for example in an AIX environment, to access program variables in a manner that supports shared libraries and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

A static linker combines one or more separately compiled object files derived from distinct source files into a single module, and builds a single GOT and/or TOC for the module that is shared by files in the module. An executing application includes at least one module, a statically linked module typically containing the function main as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module in a computer program may have a different TOC pointer value. The TOC register or GOT register (referred to hereinafter as the TOC register) may therefore be saved and restored for each function call, either by a procedure linkage table (PLT) stub code segment, or by the callee function in conventions where the TOC register is treated as a preserved (i.e., callee-saved) register.

SUMMARY

A method is provided for allowing use of the local entry point with an indirect function call.

In one aspect, the method is provided to optimize indirect function calls. An indirect function call configuration is configured. The configuration defines a first application module with a target function of the indirect function call. Similarly, the configuration defines a second application module with a symbolic reference to the target function of the indirect function call, and a third application module to originate the indirect function call. Program code is executed from an application module loaded into memory. The application module is the first application module, the second application module, the third application module, or a fourth application module. An address of a function is loaded, including an entry point address. The entry point address is either a local entry point address of the function defined in the loaded application module or the global entry point address. Then, execution is transferred to the entry point address and a program instruction is skipped. The program instruction loads a table of contents pointer register or restores a table of contents pointer register. The address of the function is used to perform the indirect function call. More specifically, the performance includes transferring execution to the entry point address. The entry point address is either the local entry point address of the function defined in the loaded application module or the global entry point address. Additionally, the performance includes skipping a program instruction. The program instruction loads a table of contents pointer register or restores a table of contents pointer register. The address of the function is used to perform the indirect function call. More specifically, the performance includes skipping over a program instruction. The program instruction loads a table of contents pointer register or restores a table of contents pointer register.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
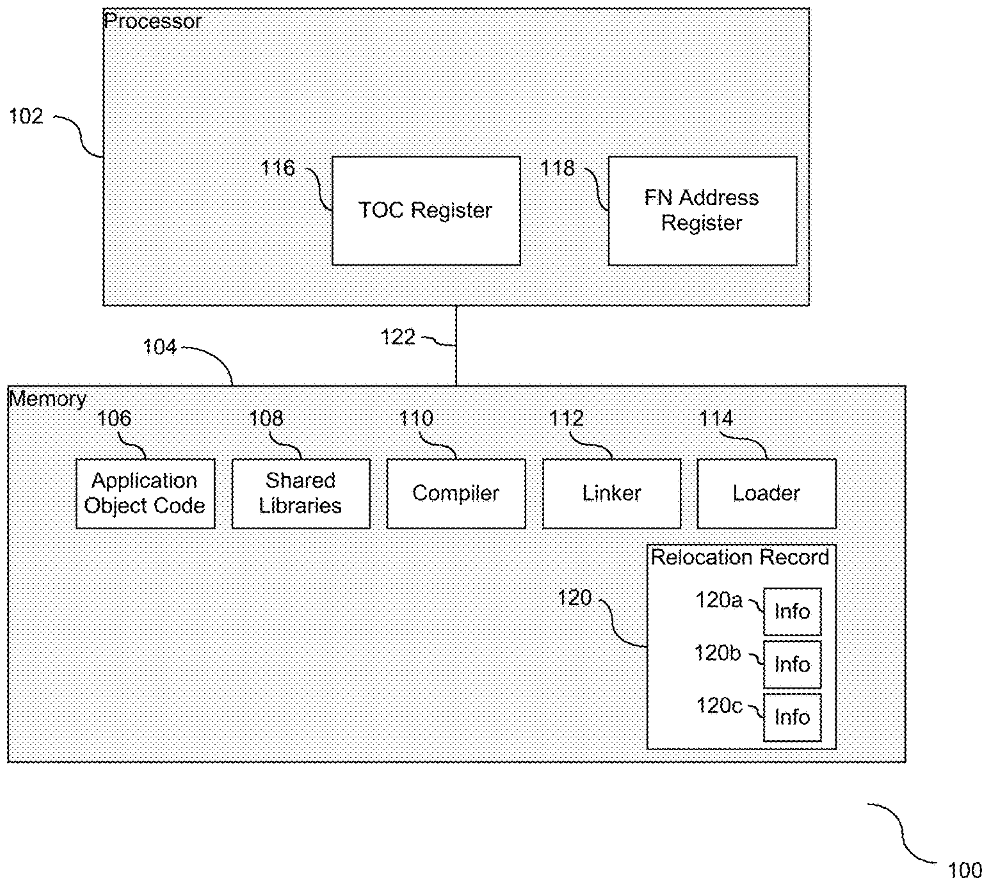
FIG. 1 depicts a computer system for a global entry point and a local entry point for a callee function.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Embodiments for a loader configured to select between a plurality of entry points of a callee function for a calling function are provided, with embodiments being discussed below in detail. Each function in application object code may have a plurality of entry points inserted by, for example, a compiler. The entry points may be inserted at certain locations within the function for different reasons. Entry points may be used to enter a callee function at a certain point within the code of the callee function, which may skip parts of the code within the function.

A dynamic shared objected (DSO) is an object file that is intended to be used simultaneously (or shared by) multiple applications while they are executing. A DSO can be used in place of archive libraries and can minimize overall memory usage since code is shared. Two executables that use the same DSO and that run simultaneously have only one copy of the shared components loaded into memory.

The ABI may use a different calling function calling sequence when calling a function in a different DSO, as opposed to a function in the same DSO. For example, the Power ELFv2 ABI allows a callee routine to provide both a global and a local entry point. Callers of that routine may use the local entry point if caller and callee reside in the same DSO and share the same TOC pointer value. Other callers must use the global entry point. Calling the global entry point is less efficient than calling the local entry point since program code at the global entry point must recalculate the TOC pointer value to be used in the callee routine. Accordingly, the compiler, static linker, and dynamic loader arrange to use the local entry point as often as possible.

Most programming languages allow for direct and indirect function calls. A direct function call takes place when the caller function transfers control to one fixed callee routine, e.g. the callee routine is being invoked directly through a fixed name or address. An indirect function call takes place when the caller function transfers control to a function identified as being invoked indirectly through a variable, e.g. function pointer variable. In one embodiment, the function pointer variable can be set to refer to any of a set of target functions. At any place where a function pointer is set to refer to a particular function, that particular function is identified by a symbol name and the computer generates code to load that symbol address and store the symbol address in the function pointer variable. The programming code that loads the symbol address will include relocations referring to the symbol, and the relocations will be resolved by the static linker and/or dynamic loader.

The static linker and/or dynamic loader determine which entry point to use from the potentially multiple entry points associated with the symbol. More specifically, the linker generates an application module, and resolves a symbolic reference to a function address. The dynamic loader loads an application module into memory. The dynamic loader may resolve a symbolic reference to a function address at load time.

FIG. 1 illustrates an embodiment of a computer system (100) for local and global entry points for a target function.

Computer system (100) comprises a processor (102) in communication with a main memory (104) across a bus (122). Application object code (106), which is generated from program source code (not shown) by a compiler such as compiler (110), comprises a plurality of functions, and is stored in main memory (104) for execution by processor (102). The application object code (106) may be generated by a compiler that is located on a different computer system from computer system (100). A relocation record (120), which is generated by a compiler, such as a compiler (110), is stored in the application object code (106) for review by the compiler (110), linker (112), or loader (114). Relocation record (120) may contain multiple pieces of information, such as (120*a*), (120*b*) and (120*c*). The linker (112) may read the relocation record (120) and if necessary generate another copy of the relocation into an executable or DSO file (e.g. a dynamic relocation). The linker (112) links the application object code (106) before the application object code (106) is executed by the loader (114). A shared library (108) stores functions that are external to application object code (106) and that may be called during execution of application object code (106) via external function calls (i.e., calls to functions in other modules). Loader (114) comprises a runtime component and executes the application object code (106). The loader (114) may inspect the relocation record present in the executable or DSO file while loading the file into a memory, such as main memory (104).

Table of Contents (TOC) register (116) is located in processor (102). TOC register stores a current value of a TOC pointer for the currently active function of application object code (106) or shared library (108). Function address register (118) is also located in processor (102), and holds an address of currently executing functions. In some embodiments, the computer system (100) may further comprise another object code module that is distinct from the application object code (106) and the shared library (108), and the other object code module may also contain functions that are called by application object code (106) via external function calls.

In one embodiment, a compiler, such as compiler (110), generates application code (106) from program source code. In one embodiment, the compiler (110) generates shared library (108). The compiler that generates application object code (106) may be located on another computer system that is distinct from computer system (100). In one embodiment, another compiler on a third distinct computer may generate shared library (108). During compilation, the compiler creates relocation record (120) and indicates in the program code whether a function pointer value is for local-use-only. The function calls in the application code (103) are resolved by the compiler (110), linker (112), or loader (114), or a combination thereof. Resolution of the function call may occur at different times for different function calls in the same application code (106). At the time of resolution of a function call, the compiler (110), linker (112), loader (114), or combination thereof, determines (a) whether a function pointer value is for local-use-only by examining the program code and (b) whether the function is defined in the same module as the reference. The compiler (110), linker (112), loader (114), or combination thereof, then inserts a local point of entry if the answer is positive to both (a) and (b) otherwise, a global point of entry is inserted.

Figure 2:
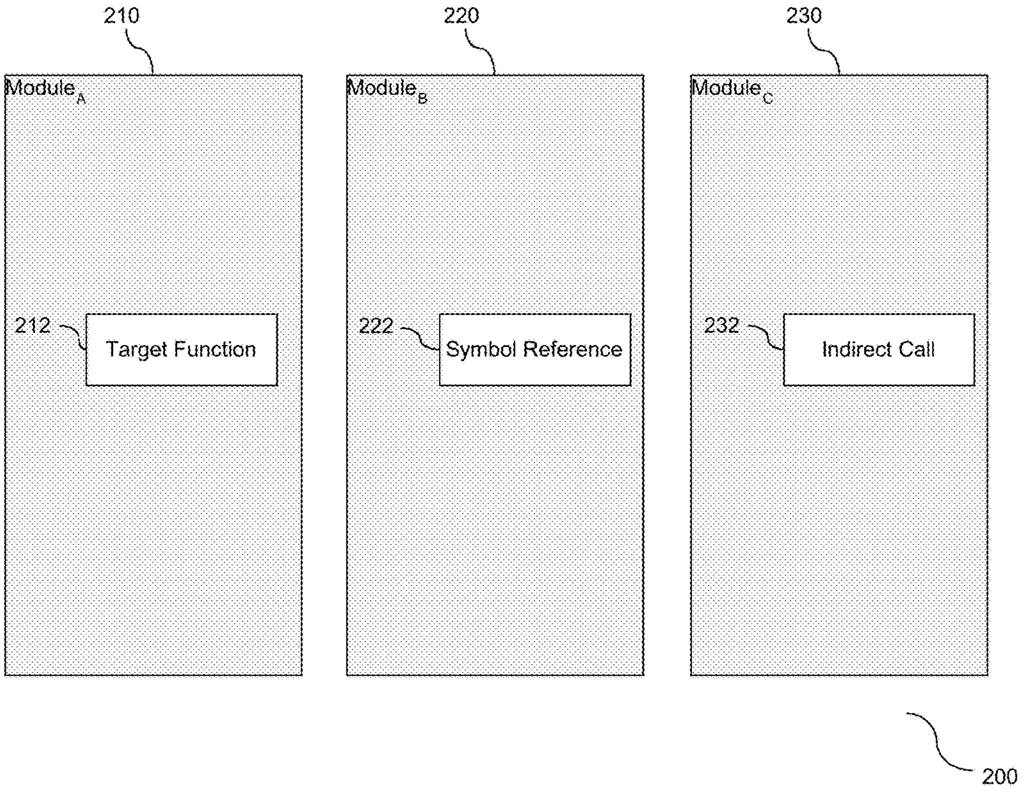
FIG. 2 depicts a block diagram for illustrating an embodiment of an indirect call configuration.

FIG. 2 is a block diagram (200) illustrating an embodiment of an indirect call configuration. There are three application modules, module$_A$ (210), module$_B$ (220) and module (230). A target function (212) of an indirect call is defined in module$_A$ (210). Module$_B$ (220) contains a reference of a symbol (222) to initialize a function pointer. Module$_C$ (230) contains an indirect call (232) that occurs through the function pointer. In one embodiment, module$_A$ (210), module$_B$ (220) and module$_C$ (230) are dynamically shared objects (DSOs). The determination of the indirect call configuration is discussed in further detail with respect to FIGS. 3-6.

Figure 3:
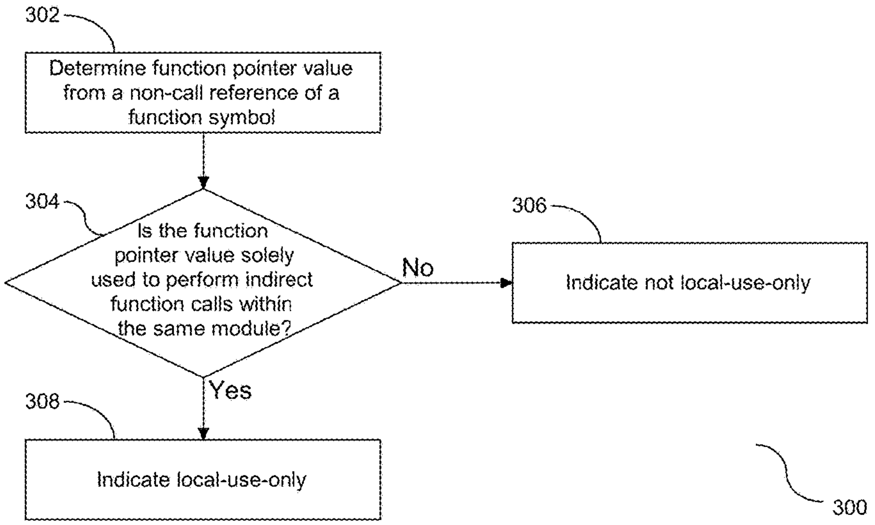
FIG. 3 depicts a flow chart illustrating an embodiment of how a compiler will determine and indicate the function pointer values are for local-use-only.

Referring to FIG. 3, a flow chart (300) is provided illustrating an embodiment of how a compiler will determine and indicate a function pointer value is for local-use-only. The compiler determines a function pointer value resulting from a non-call reference, see (222), of a function symbol (302). The compiler (110) determines whether the function pointer value resulting from a non-call reference (222) of a function symbol is solely used to perform indirect function calls within the same module, e.g. "local-use-only" (304). In order to correctly make the determination, the compiler (110) may perform an exhaustive code-flow and data-flow analysis determining all uses of the function pointer value resulting from a non-call reference (222) to a function symbol. This analysis may involve determining (a) that the value is never returned from the function where it is used, (b) it is stored only in function pointer variables that are local to a function, or (c) it is only stored in function pointer variables that are local to a source file and whose address is never taken. In one embodiment, the compiler (110) tracks all places where a function pointer value is written or initially read. In one embodiment, the determination is performed by using an escape analysis, which determines a set of uses for the function pointer value. Each use returned by the escape analysis must be further analyzed to determine if every use is an indirect function call within the same module (304) as the non-call reference (222). In one embodiment, a compiler, such as compiler (110), makes the determination at step (304) by determining a local live range, L, that is visible in the local module only. The compiler (110) will determine the transitive closure of the live range, L, is only used in a function call within the local module. The compiler (110) determines if a reference to a function symbol is used to initialize the live range, L.

The response to the determination at step (304) will be indicated in the program code. In order for the compiler (110) to indicate the information for use by the linker (112) or loader (114), the compiler (110) generates program code that uses relocations associated with the target function symbol. The compiler (110) may already generate code to reference a function symbol for non-call purposes thus, the program code may contain a relocation record (120). In one embodiment, the relocation record is an instruction to the linker to fill in a "placeholder" left in the object code with the actual address of the identified target function. The relocation record (120) contains several pieces of information, including, but not limited to, the location of the "placeholder" (120*a*) to be filled in (e.g. by the local entry point address or global entry point address of the target function), the name of the target symbol (120*b*), and a relocation type (120*c*) describing which of possible multiple actions to perform. The quantity and type of information contained in the relocation record is for illustration purposes only and should not be considered limiting.

In one embodiment, in order to pass the information of the determination at step (304) to the linker (112), the compiler (110) indicates whether or not the function pointer value is local-use-only in the relocation type (120*c*). For example, if the answer to the determination step (304) is negative, e.g. it is determined there are uses beyond indirect calls in the local module, the compiler will indicate not local-use-only by a first relocation type (306). In one embodiment, other uses beyond indirect calls in the current module can include function pointer comparisons, conversions to integers or other non-function-pointer types (either via casts or type-punning via unions), or accessing parts of the function pointer value in memory. In one embodiment, one class of other uses can be allowed, while still making a correct local-use-only determination (e.g. a comparison of the value against a NULL function pointer constant). If the compiler (110) makes a positive determination at step (304), where the function pointer value is indeed local-use-only, the compiler (110) will indicate local-use-only by a second relocation type (308). In one embodiment, the compiler indicates to a loader whether or not a symbol reference is local-use-only. Accordingly, the compiler (110) can indicate to a linker whether or not a symbol reference (e.g. function pointer value determined via a reference to a function symbol) is designated as local-use-only.

Figure 4:
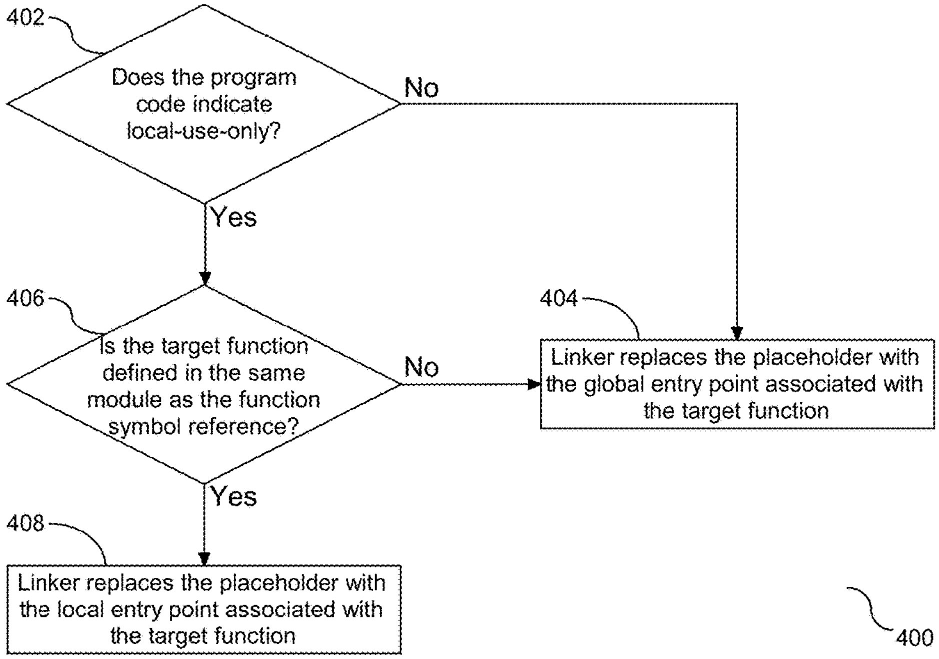
FIG. 4 depicts a flow chart illustrating an embodiment of how a linker will interpret the information indicated from a compiler and resolve the relocation.

Referring to FIG. 4, a flow chart (400) is provided to illustrate an embodiment of the linker, and more specifically demonstrate how the linker is employed to interpret the information indicated from a compiler, and to also resolve the relocation of the actual target function address. The linker (112) resolves the relocation of the actual target function address by replacing the placeholder within the application code, as indicated in the relocation record (120*a*) with the actual target address. The linker (112) can use a local entry point or a global entry point of the target function for the target address. As shown, the linker (112) determines whether the program code indicates the function symbol reference is local-use-only (402). For example, the linker (112) may inspect the relocation type (120*c*) associated with target function symbol in the relocation record (120). If at step (402) the linker (112) determines the relocation type (120*c*) is a first relocation type (e.g. not local-use-only), the linker (112) replaces the placeholder indicated by the relocation record (120*a*) with the global entry point associated with the target function (404). However, if at step (402) the linker determines that the relocation record shows the object as having a second relocation type (e.g. local-use-only) the linker proceeds to step (406) to further assess whether the target function is defined in the same module as the function symbol reference. A negative response to the determination at step (406) is followed by the replacement of the placeholder shown and described in step (404). However, a positive response to the determination at step (406) is followed by the linker replacing the placeholder indicated by the relocation record (120*a*) with the local entry point associated with the target function (408). In one embodiment, at step (408) the linker removes the symbolic reference prior to replacing the local entry point address. Accordingly, as shown herein, the linker (112) may resolve a local-use-only indication from a compiler (110) and use a local entry point for resolving a location.

Figure 5:
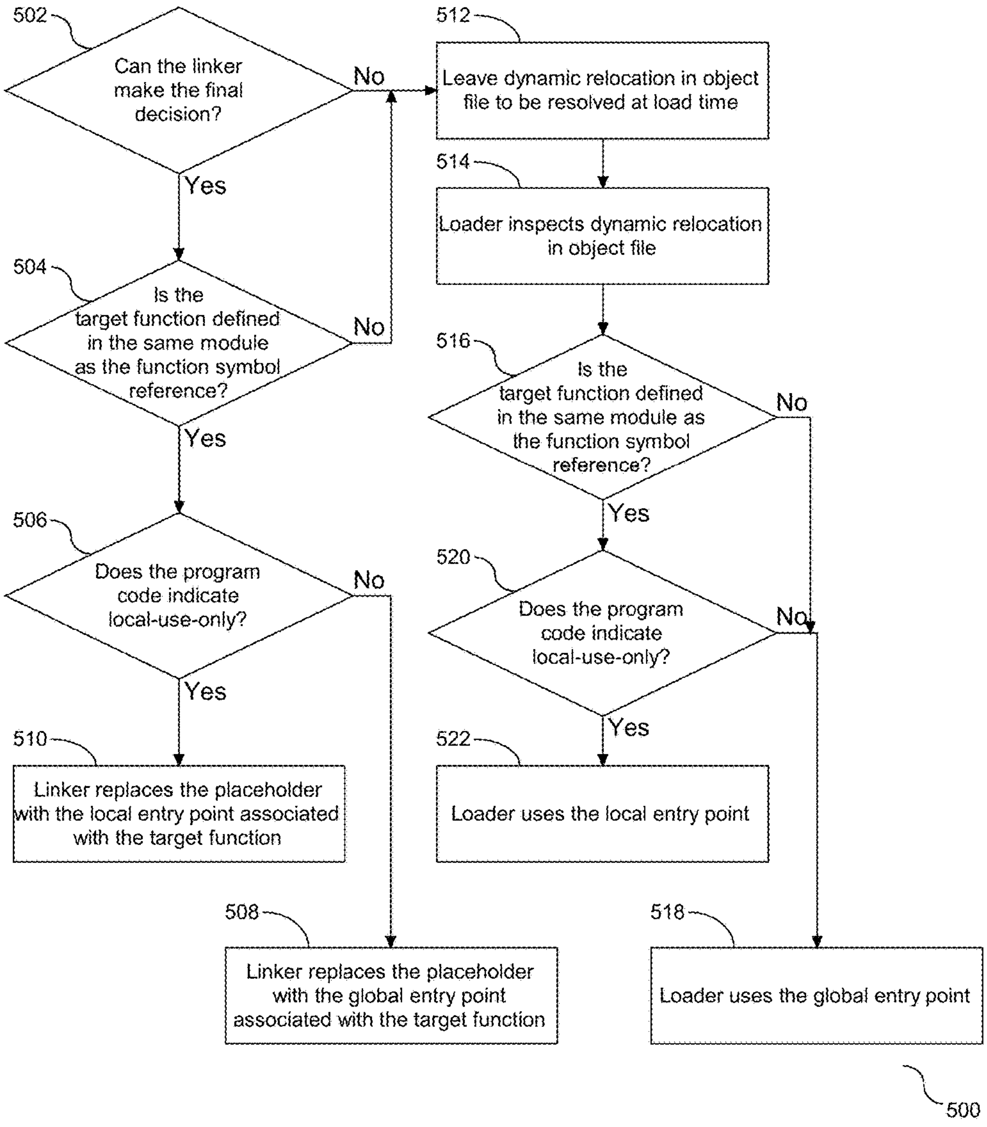
FIG. 5 depicts a flow chart illustrating an embodiment of when relocation cannot be fully resolved by a linker and is resolved by a loader.

Referring to FIG. 5, a flow chart (500) is provided illustrating an embodiment when a relocation may not be able to be fully resolved by the linker. In one embodiment, the target function (e.g. the function that will be the target of the indirect function call) is not yet known to the linker (112) (e.g. the current module does not contain any function with the function name stored in the relocation record). In one embodiment, another object that is not in the same module as the function symbol reference contains a second function of the same name referenced by the symbol and Executing and Linking Format (ELF) name resolution rules require that any use of the function name is resolved to the second function address (e.g. the symbol refers the second address and the linker/loader will use the entry point associated with the second function). In one embodiment, the linker (112) cannot make a final determination that the function in the current module is indeed the target function referenced by the symbol.

In one embodiment, the linker (112) determines whether or not it can make the final determination of whether or not the target function is defined in the same module as the function symbol reference (502). The linker (112) cannot make the final decision in scenarios where the linker (112) does not have access to all of the modules needed to operate the application module where the function symbol may reference a function by the same name in another module yet to be found. A positive response to the determination at step (502) is followed by the linker (112) proceeding to determine whether the target function is defined in the same module as the function symbol reference (504). If the response to the determination at step (504) is positive, the linker proceeds to determine if the program code indicates if the function symbol reference is local-use-only (506). In one embodiment, the linker (112) inspects the relocation type (120*c*) associated with target function symbol in the relocation record (120) to complete the assessment at step (506). During this inspection if it is determined that the location type (120*c*) is the first relocation type, e.g. not local-use-only, the linker will replace the placeholder indicated by the relocation record (120*a*) with the global entry point associated with the target function (508). However, if at step (506) it is determined that the relocation type (120*c*) is a second relocation type, e.g. local-use-only, the linker (112) replaces the placeholder indicated by the relocation record (120*a*) with the local entry point associated with the target function (510). Accordingly, as shown herein, there is a plurality of circumstances that enable the linker to replace the placeholder, either with the global entry point, see step (506), or with the local entry point, see step (510).

Returning to step (502), if it is determined that the linker cannot make a final decision with respect to whether or not the target function is defined in the same module as the function symbol reference, the linker (112) leaves a dynamic relocation in the executable file (512), which can be resolved at a load time by the loader (114). Similarly, returning to step (504) if it is determined that the target function is not defined in the same module as the function symbol reference, the linker (112) leaves a dynamic relocation in the executable file at step (512). As shown, following step (512), the loader (114) inspects the dynamic relocation in the executable file (514). Based on the inspection, the loader (114) determines whether the target function is defined in the same module as the function symbol reference (516). A negative response to the determination at step (516) is followed by use of the global entry point associated with the target function (518). If the response to the determination at step (516) is positive, the loader proceeds to step (520). Accordingly, the linker can leave a dynamic relocation which the loader can inspect to determine which entry point to use.

At step (520), the loader (114) determines if the program code indicates if the function symbol reference is local-use-only. A positive response to the determination at step (520) is followed by use of the local entry point associated with the target function (522). A negative response to the determination at step (520) is followed by use of the global entry point associated with the target function as shown in step (518). In one embodiment, the loader inspects the dynamic relocation and determines whether the target function is local-use-only. In one embodiment, if the loader determines the target function is not local-use-only, e.g. first relocation type, the loader adds a global entry point without determining the location of the definition of the target function. As demonstrated, the final determination of whether to use the global entry point or local entry point is under the direction of the loader (114). Accordingly, the process shown herein checks for the local-use-only relocation, and if it is not present, the local entry point is not used.

Figure 6:
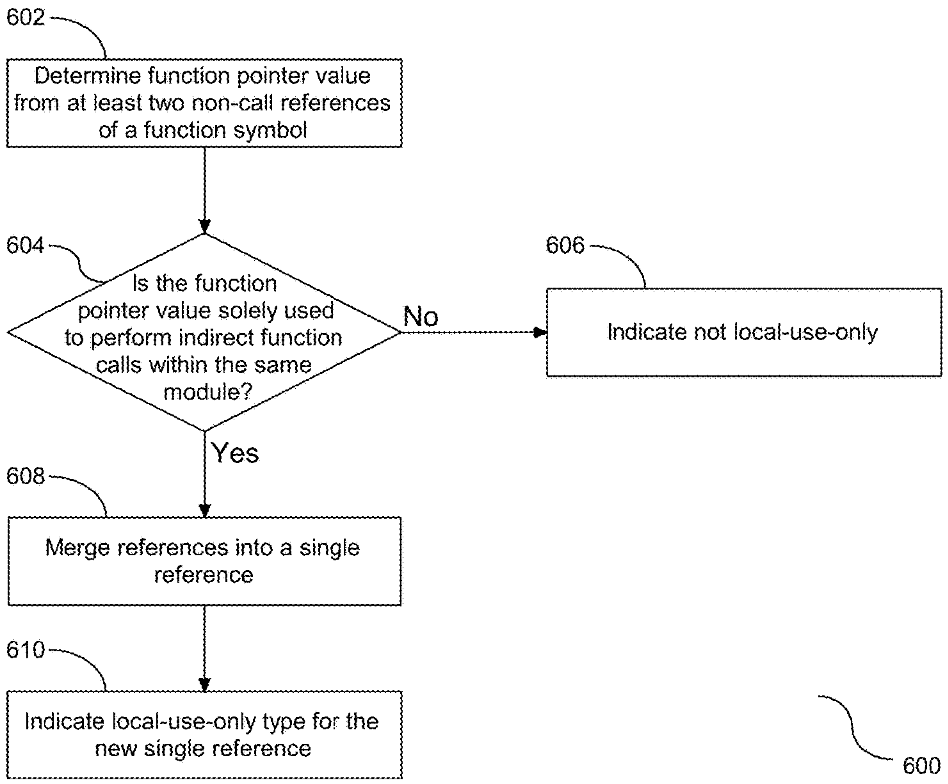
FIG. 6 depicts a flow chart illustrating an embodiment of how a compiler will determine and indicate the function pointer value from a non-call reference of at least two function symbols are for local-use-only.

Referring to FIG. 6, a flow chart (600) is provided illustrating an embodiment of how the compiler (110) determines and indicates the function pointer value from at least two non-call references to a function symbol are for local-use-only. The compiler (110) determines the function pointer value(s) resulting from at least two non-call references of a function symbol (602). Based on the function pointer value(s), the compiler (110) determines whether the function pointer value(s) resulting from at least two non-call references to a function symbol is solely used to perform indirect function calls within the same module (604). See FIG. 3, step (304) for further details in the determination at step (604). A negative response to the determination at step (604) is followed by the compiler indicating that the function pointer value(s) are not exclusive for local-use-only by a first relocation type (606). However, a positive response to the determination at step (604) is followed by the compiler (110) merging the at least two non-call references into a single reference (608) and indicating local-use-only by a second relocation type for the new single reference (610). In one embodiment, the merged referenced is used to initialize both non-call references. In one embodiment, the compiler (110) indicates a new merged symbol reference is local-use-only to the linker, and in another embodiment, the compiler indicates the local-use-only to the loader.

Figure 7:
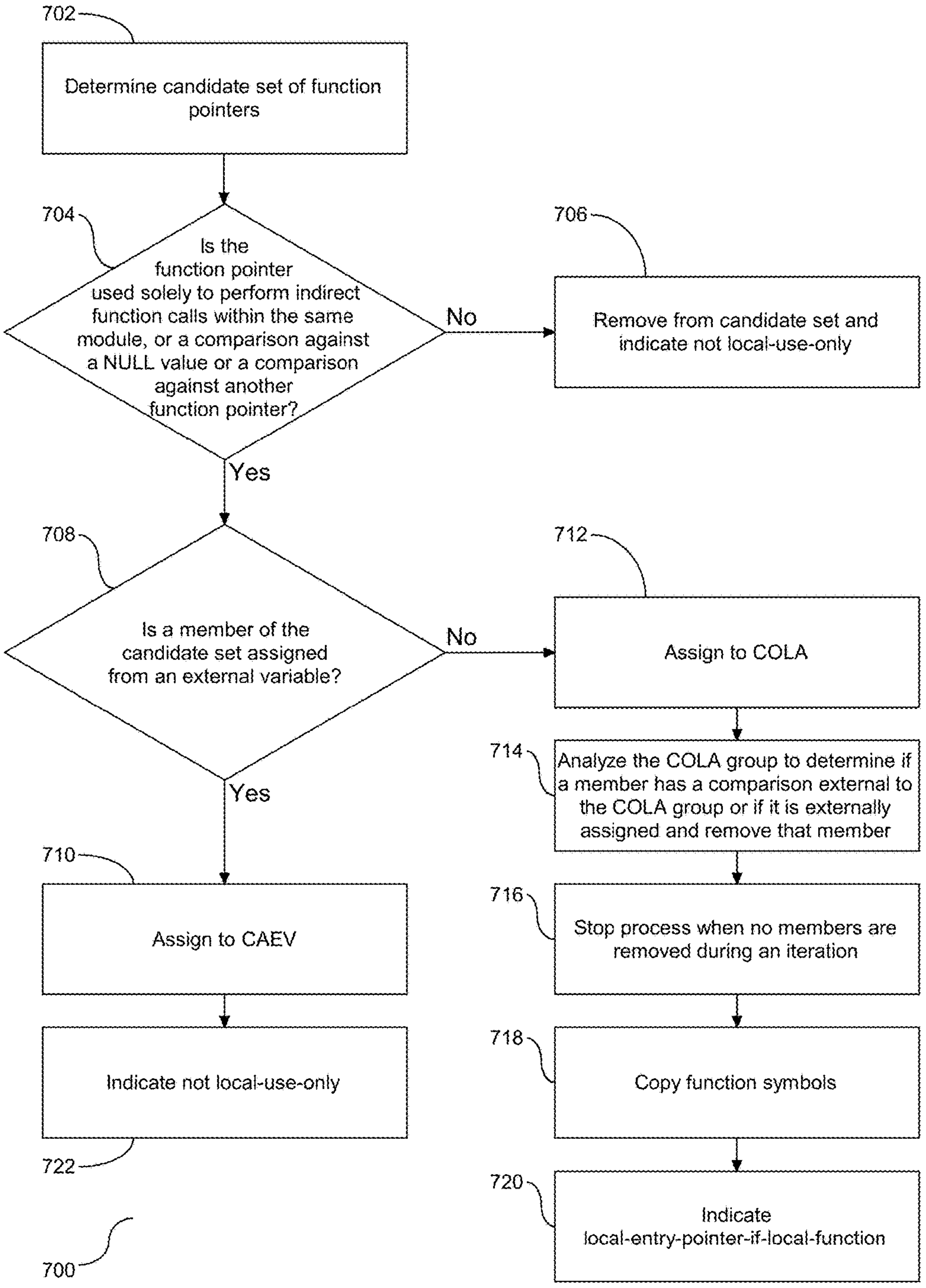
FIG. 7 depicts a flow chart illustrating an embodiment of how a compiler will determine and indicate a function pointer can be localized while enabling function pointer comparisons.

Referring to FIG. 7, a flow chart (700) is provided illustrating an embodiment of how a compiler will determine and indicate a function pointer can be localized while enabling function pointer comparisons. The compiler determines a candidate set of function pointers resulting from at least one non-call reference (e.g. (222)) of at least one function symbol (702). In one embodiment, the set determined at step (702) includes at least one function pointer. The compiler (110) determines whether the candidate set of function pointers is used solely to perform indirect function calls within the same module (704) as the function symbol reference. In one embodiment, the determination at step (704) includes allowing other uses such as a comparison against a NULL value or a comparison against another function pointer. If a negative answer to the determination at step (704) is found the function pointer is removed from the candidate set and indicated as not local-use only (706). Accordingly, the initial assessment of the function pointer evaluates a candidate set of functions pointers with respect to performing an indirect function call, and specifically, the associated pointer values for indirect function calls within the same module.

If at step (704) it is determined that the function pointer is solely used to perform an indirect function call within the same module, or in comparisons against a NULL value or a comparison against another function pointer, as evidenced by a positive response to the determination at step (704), the candidate set of function pointers is then analyzed to determine whether the function pointers may be assigned from an external variable (708). The nature of the response to the determination at step (708) is followed by an assignment of the candidate function pointer to one of two groups. As shown, a positive response to the determination at step (708) is followed by the candidate function pointer being assigned to a Candidate Assigned from External Variable (CAEV) group (710) indicating a first relocation type (e.g. not local-use-only) (722). A negative response to the determination at step (708) is followed by the candidate function pointer being assigned to the Candidates with Only Local Assignments (COLA) group (712).

Following the COLA group assignment at step (712), the members of the COLA group are analyzed to determine if a member of the COLA group contains a comparison to another function pointer, function pointer value, or function pointer constant not contained in the COLA group (714). In addition, during step (714) the members of the COLA group are analyzed to determine if a member variable in the COLA group is assigned from a value outside the COLA group. Any member found to have a comparison external to the COLA group and any member having a variable found to have an assignment external to the COLA group is removed from the COLA group. In one embodiment, due to the dynamic nature of the COLA group (e.g. varying membership), the process of step (714) is performed iteratively until no members are removed from the COLA group during an iteration of the analysis (716). Accordingly, a COLA group is formed having members with only comparisons to other members in the COLA group and members having variables assigned from members within the COLA group.

In order to ensure local assignment of the function pointers symbols, function pointer constants assigned to a function pointer variable in the COLA group or compared with a function pointer variable in the COLA group are copied (718). Copying is performed as the original function pointer constant may be used by an external module. Copying the function pointer constants enables any external module to use the original function pointer constant and the function pointers in the COLA group to use the copied function pointer constant. In this way, the copied function pointer constant cannot be initialized from an outside module. The remaining COLA group found at step (716) will be indicated in the program code as local-entry-pointer-if-local-function (720).

In one embodiment, in order to pass the COLA group found at step (716) to the linker (112), the compiler (110) may indicate a third relocation type (120*c*), e.g. local-entry-pointer-if-local-function. In one embodiment, if the function pointer contained in the candidate set is only used to perform indirect function calls within the same module or a comparison against a NULL value at step (704) the compiler (110) may then indicate the function pointer according to step (308). In one embodiment, the third relocation type, as described above, is the same as the second relocation type as described and shown in FIG. 3, e.g. local-use-only. In one embodiment, the functions removed from the COLA group are assigned the first relocation type as described and shown in FIG. 3, e.g. not local-use-only. In one embodiment, the compiler indicates to a loader whether or not a function pointer value can be initialized with a local-entry-pointer-if-local-function in the relocation type. Accordingly, the compiler (110) indicates to a linker whether or not a function symbol reference (e.g. function pointer value determined via a reference to a function symbol is designated as local-entry-pointer-if-local-function.

In one embodiment, the relocation type designation must to be applied to all function pointers contained in the COLA group, i.e. globally. In one embodiment, any comparison with a function pointer in the COLA group should be resolved within the scope of the same module and locality rules. In one embodiment, where each function pointer constant used in conjunction with function pointer variables assigned to the COLA group are copied and the function pointer constants have the same relocation types, all instances of the function pointer constants are resolved in the same manner by the linker or loader.

Figure 8:
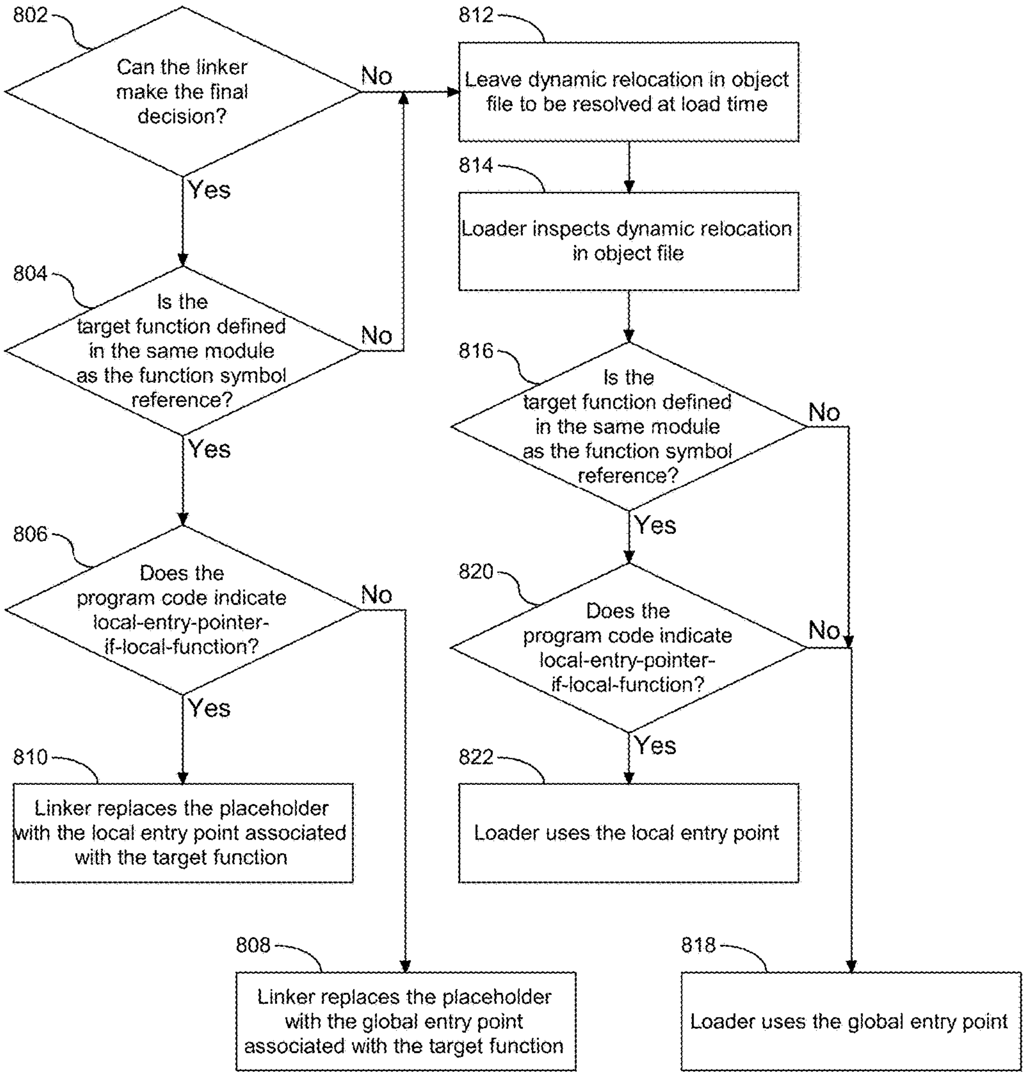
FIG. 8 depicts a flow chart illustrating an embodiment when relocation is resolved by the linker or the loader.

Referring to FIG. 8, a flow chart (800) is provided illustrating a process for resolving relocation by the linker or the loader. As shown herein, the linker (112) determines whether or not it can make the final determination of whether or not the target function is defined in the same module as the function symbol reference (802). The linker (112) cannot make the final decision in scenarios where the linker (112) does not have access to all of the modules needed to operate the application module, such as where the function symbol may reference a function by the same name in another module yet to be found. A negative response to the determination at step (802) is followed by the linker (112) leaving a dynamic relocation in the executable file (812), which can be resolved at a load time by the loader (114). A positive response to the determination at step (802) is followed by the linker (112) proceeding to determine whether the target function is defined in the same module as the function symbol reference (804). If the response to the determination at step (804) is positive, the linker (112) proceeds to determine if the program code indicates if the function symbol reference is local-entry-pointer-if-local-function (806). A negative response to the determination at step (804) is followed by the linker (112) leaving a dynamic relocation in the executable file, as shown in step (812). Accordingly, the linker (112) does not add an entry point when it does not have access to the information to make the determination of whether or not the target function is defined in the same module as the reference.

As shown, during step (806), the linker (112) inspects the relocation type (120*c*) associated with a target function symbol in the relocation record (120). During this inspection if it is determined that the location type (120*c*) is the first relocation type, e.g. not local-use-only, the linker (112) replaces the placeholder with the global entry point associated with the target function (808). However, if at step (806) it is determined that the relocation type (120*c*) is a third relocation type, e.g. local-entry-pointer-if-local-function, the linker (112) replaces the placeholder indicated by the relocation record (120*a*) with the local entry point associated with the target function (810). Accordingly, a linker assigns a local entry point if the linker determines the target function is defined in the same module as the reference.

As shown, following a negative determination at step (802) or step (804), and more specifically, following step (812), the loader (114) inspects the dynamic relocation left by the linker (112) in the executable file (814). Based on the inspection, the loader (114) determines whether the target function is defined in the same module as the function symbol reference (816). A negative response to the determination at step (816) is followed by use of the global entry point associated with the target function (818). However, a positive response to the determination at step (816) is followed by use of the local entry point associated with the target function (820). In one embodiment, the loader inspects the dynamic resolution and determines whether the target function is local-entry-pointer-if-local-function. In one embodiment, if the loader determines the target function is not local-use-only, e.g. first relocation type, the loader adds a global entry point without determining the location of the definition of the target function. Accordingly, as demonstrated, the determination of whether to use the global entry point or local entry point is demonstrated in FIG. 8 to be under the direction of the linker (112) or loader (114).

Figure 9:
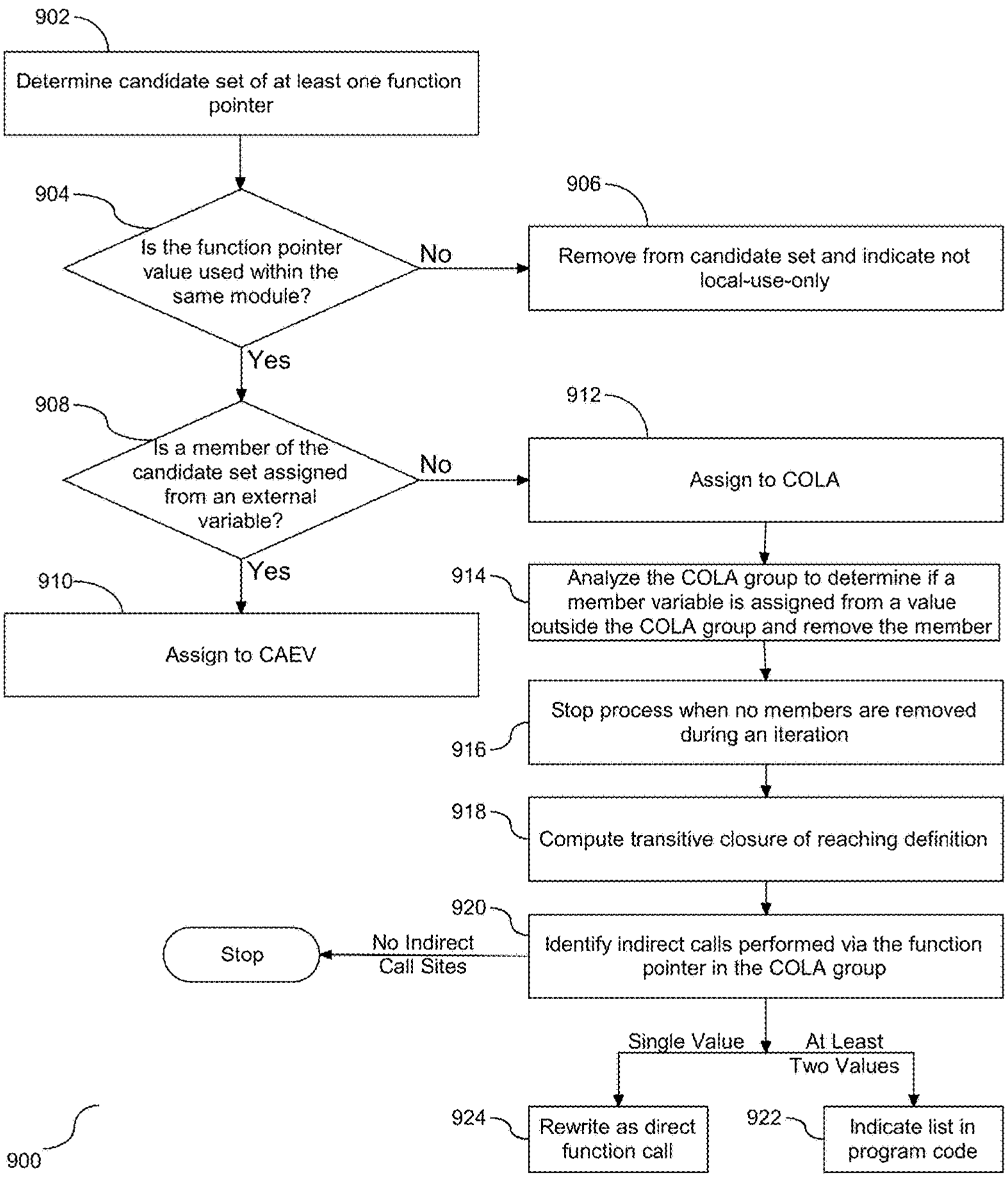
FIG. 9 depicts a flow chart illustrating an embodiment of employing the compiler to enable a local function call to be tailored for function pointer calls.

Referring to FIG. 9, a flow chart (900) is provided illustrating an embodiment of a method of employing the compiler to enable an indirect function call to be tailored for local calls. The compiler determines a candidate set of at least one function pointer resulting from at least one non-call reference (e.g. (222)) of at least one function symbol (902). From the candidate set of function pointers, the compiler (110) determines whether the candidate set of at least one function pointer is/are used to perform indirect function calls within the same module (904) as the function pointer. A negative response to the determination step (904) is followed by removal of the function pointer from the candidate set and the compiler (110) does not annotate the associated indirect function call site (906). However, a positive answer to determination step (904) is followed by analysis of the remaining candidate set to determine whether the function pointers may be assigned from an external variable (908). In one embodiment, the function pointer is used both to perform an indirect function call in the same module and a use in another module; examples of other uses are described above. Accordingly, the first part of the method shown herein conducts an assessment of the candidate set of function pointers, including an assessment against a NULL value.

A positive response to the determination step (908) is followed by the candidate function pointer being assigned to a Candidate Assigned from External Variable (CAEV) group and the compiler (110) does not annotate the associated indirect call site (910). However, if the response to the determination at step (908) is negative, the candidate function pointer is assigned to a Candidates with Only Local Assignments (COLA) group (912). Accordingly, the evaluation of a candidate function pointer at step (908) includes an assignment of the candidate function pointer to either the COLA or CAEV group.

Following population of the COLA group at step (912), the members of the COLA group are analyzed to determine if a member variable in the COLA group is assigned from a value outside the COLA group (914). Any member variable found to have an assignment external to the COLA group is removed from the COLA group. In one embodiment, the process of step (914) is performed iteratively until no members from the COLA group are removed during an iteration of the analysis (916). For each member remaining in the COLA group after step (914) the transitive closure of the reaching definition is computed (918). The reaching definition determines variables which can be assigned to the member without an intervening assignment between the variable and the member. The compiler (110) creates a list of one or more elements which may include but is not limited to a function pointer constant(s) based on the transitive closure of the reaching definition. The element(s) are potential target functions of the indirect function call. In one embodiment, the list of elements includes at least all potential target functions for the indirect function call. In one embodiment, following step (918), the compiler (110) identifies indirect calls performed with the function pointer (920). However, if a function pointer is not used to perform any function calls no further actions are taken on that function pointer. Following step (920) if the computed transitive closure at step (918) consists of a single element, the compiler (110) rewrites the indirect function call into a direct function call based on the single element obtained from the transitive closure (924). If the list created by the transitive closure of step (918) consists of at least two elements, the compiler (110) provides the list in the program code to a linker in conjunction with the indirect call site (922). Accordingly, the compiler provides a list of elements associated with the transitive closure of a function pointer to a linker.

In order to pass the elements in the list of elements created at step (918) to the linker (112), the compiler (110) annotates the indirect call site. In one embodiment, the compiler (110) will indicate the elements in the list at the indirect call site including a reference to a function symbol identifying a potential target function found by computing the transitive closure of the reaching definition. In one embodiment, the compiler will annotate the indirect call site by referencing a location containing the list of elements. In one embodiment, the compiler annotates the indirect call site by referencing multiple locations. Accordingly, the compiler (110) can indicate to a linker whether or not a call site is annotated by a list of elements from computing the transitive closure of the function pointer.

Figure 10:
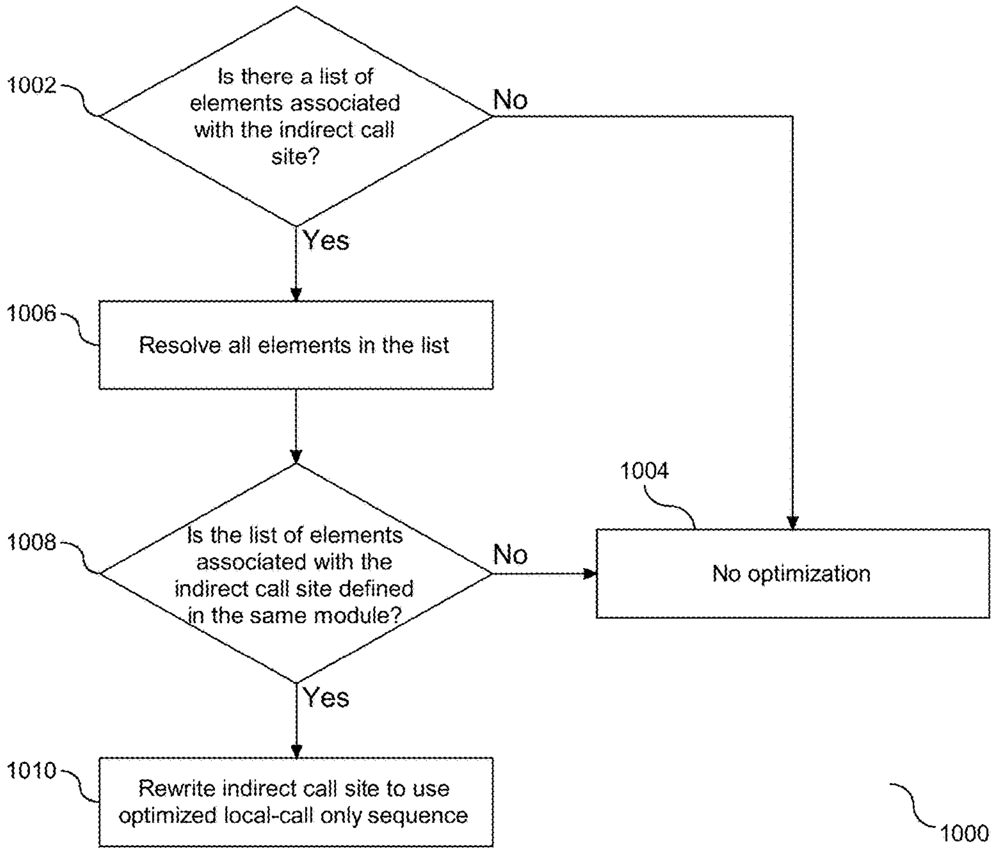
FIG. 10 a flow chart illustrating an embodiment when the call site is optimized by the linker.

The list of elements indicated by the compiler, as shown and described in FIG. 9, may be used by the linker to optimize the indirect call site. Referring to FIG. 10, a flow chart (1000) is provided illustrating an embodiment when an indirect call site is optimized by the linker. As shown, the linker (112) determines whether there are elements in a list associated with the indirect call site (1002). If at step (1002) the linker (112) determines the response to be negative, the linker (112) does not perform any optimization on the call site (1004). However, if the response to the determination at step (1002) is positive, the linker proceeds to resolve the location(s) of the elements in the list associated with the indirect call site (1006). Accordingly, the linker (112) does not optimize an indirect call site if a list of elements is not indicated in the program code.

After the linker has resolved the location of the elements in the list at step (1006), the linker (112) determines whether the elements in the list associated with an indirect call site are defined in the same module as the indirect call site (1008). In one embodiment, it is determined whether every element in the list associated with an indirect call site is defined in the same module as the indirect call site. If the response to the determination at step (1008) is positive, the linker (112) optimizes the indirect call site by rewriting it for a local-call only sequence. In one embodiment, a positive determination at step (1008) is followed by the linker changing the program code at the call site to omit the loading or restoring of a TOC pointer register. If the response to the determination at step (1008) is negative, the process proceeds to step (1004) and does not optimize the indirect call site. In one embodiment, the compiler performs the operations of the linker. Accordingly, as shown herein the linker optimizes the indirect call site if the linker determines the list of elements indicated in the program code associated with a function symbol reference are defined in the same module as the function symbol reference.

A callee routine may provide both a global and a local entry point. Callers of that routine may use the local entry point if caller and callee reside in the same module and share the same TOC pointer value. Callers outside of the module must use the global entry point. It is advantageous to use local entry points at call sites as well as at symbolic references to increase the efficiency of the compiler, linker and loader. Additionally, when the application object code to perform a function call is executed, the TOC pointer value in the TOC register may be saved to a TOC save area in the stack frame and later restored from the save area. However, if the caller and callee reside in the same module and share the same TOC pointer value, the save and restore of the TOC pointer may not be necessary. Optimizing the call site by reducing the save and the load of a TOC pointer may reduce processor resource utilization when executing the code. Thus, a method is described below to efficiently determine a call site(s) which can be optimized for local-call only sequences and a function pointer value(s) which can be optimized for local-use-only.

Figure 11:
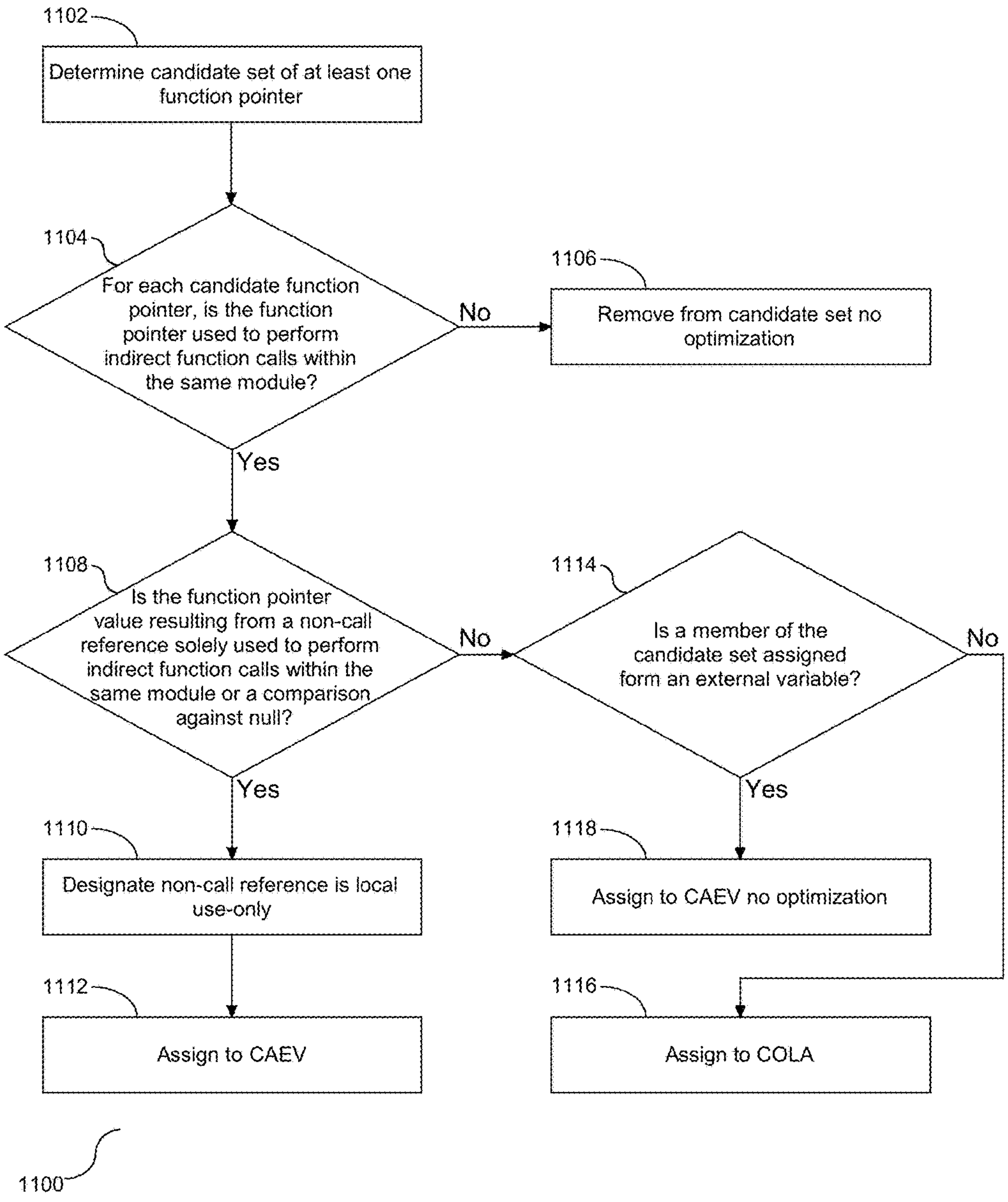
FIG. 11 depicts a flow chart illustrating an embodiment of the compiler performing an optimal resolution of a function symbol and an indirect call site.

Referring to FIG. 11, a flow chart (1100) is provided illustrating an embodiment of the compiler performing an optimal resolution of a function symbol and an indirect call site. As shown, the compiler (110) creates a candidate set of at least one function pointer resulting from a non-call reference of a function symbol (1102). The compiler (110) determines whether the function pointer value(s) resulting from a non-call reference (222) of a function symbol is used to perform indirect function calls within the same module as the function symbol reference (1104). If the response to the determination at step (1104) is positive, the compiler will proceed to step (1108) to further analyze the candidate set. However, if the response to the determination at step (1104) is negative, the candidate is removed from the set and no further optimization is performed on the function pointer (1106). In one embodiment, the compiler (110) indicates not local-use-only in the program code at step (1106). Accordingly, the compiler (110) can determine a candidate set of function pointers for further analysis.

As shown, at step (1108) the compiler (110) determines whether the function pointer value of a candidate resulting from a non-call reference is solely used to perform indirect function calls within the same module as the function symbol reference or a comparison against NULL. If the response to the determination at step (1108) is positive, e.g. it is determined there no uses beyond indirect function calls within the local module or the other use is a NULL comparison, the compiler will proceed to indicate in the program code that the function pointer value is for local-use-only (1110). Following step (1110), the compiler (110) assigns the candidate function pointer to a Candidates with Only Local Assignments (COLA) group (1112). However, if the response to the determination at step (1108) is negative, the candidate is subject to further analysis at step (1114) before a group assignment. Accordingly, the compiler may indicate a function pointer value is local-use only and proceed to further optimize the call site of the function pointer.

At step (1114), the compiler (110) determines whether the member of the candidate set may be assigned from an external variable. If the response to the determination at step (1114) is positive, the candidate function pointer is assigned to a group referred to as the Candidate Assigned from External Variable (CAEV) group (1118) and no optimization is performed on the group member(s). In one embodiment, the assignment at step (1118) includes the compiler (110) indicating not local-use-only in the program code for the member(s). If the response to the determination at step (1114) is negative, the compiler will proceed to assign the candidate to the COLA group which is subject to further analysis (1116). Accordingly, the compiler (110) can indicate function symbol references that are not local-use-only.

Figure 12:
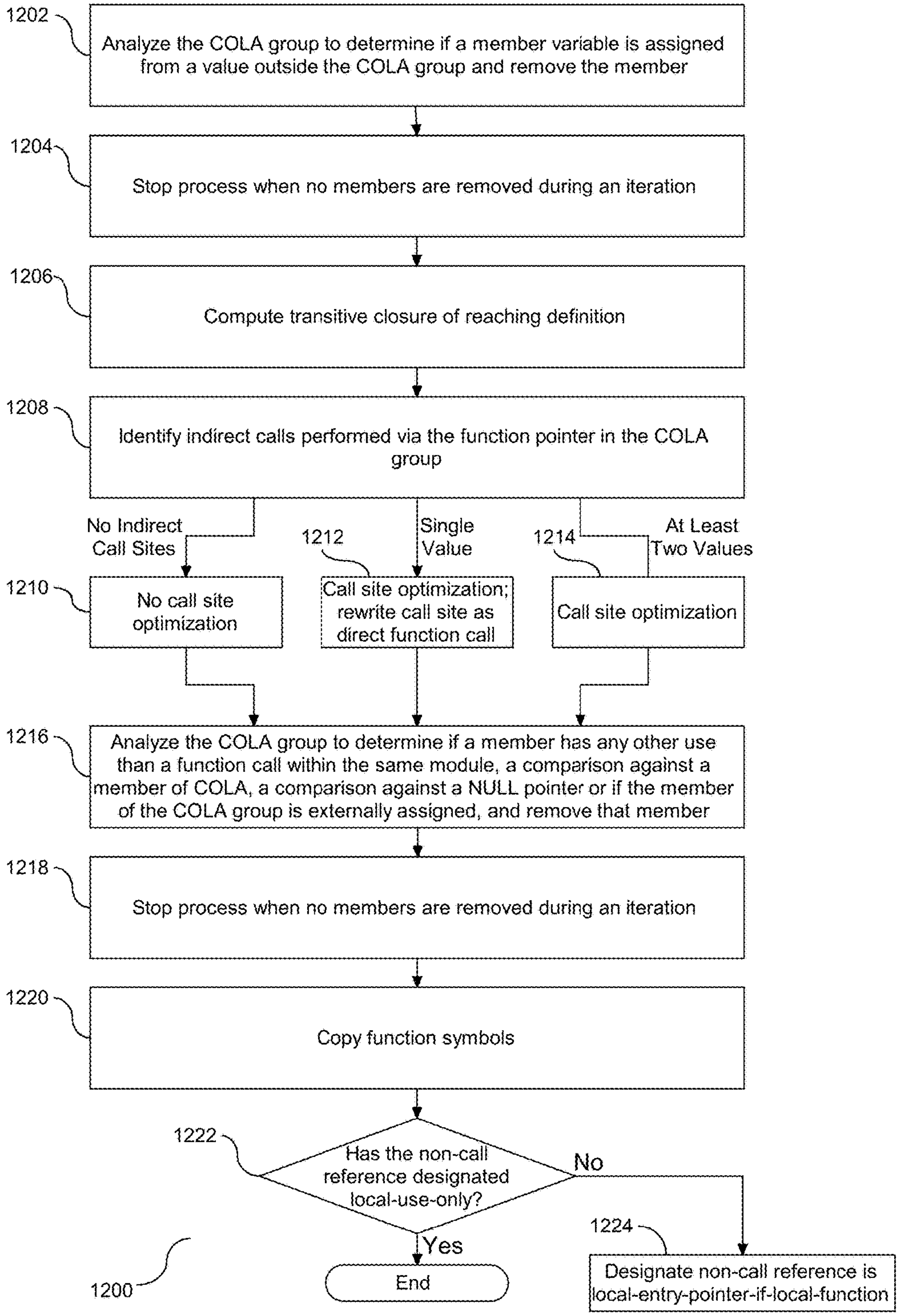
FIG. 12 depicts a flow chart illustrating an embodiment of the compiler performing an analysis of the COLA group.

Members of the COLA group are assigned from steps (1112) and (1116). Referring to FIG. 12, a flow chart (1200) is provided illustrating analysis of the COLA group. As shown, the compiler (110) determines whether a member variable is assigned from a value outside of the COLA group (1202). Any member variable found to have an assignment external to the COLA group is removed from the COLA group. In one embodiment, the process of step (1202) is performed iteratively until no members from the COLA group are removed during an iteration of the analysis (1204).

For each member remaining in the COLA group after step (1204), the transitive closure of the reaching definition is computed, which contains a list of elements (1206). In one embodiment, following step (1206), the compiler (110) identifies indirect calls performed with the member function pointer (1208). However, if a member function pointer is not used to perform any function calls no call site optimization is performed based on that function pointer (1210). Accordingly, the compiler determines members of the COLA group that may be optimized at their call sites.

Following step (1208), if the computed transitive closure at step (1206) consists of a single element, the compiler (110) performs call site optimization by rewriting the indirect function call into a direct function call based on the single element obtained from the transitive closure (1212). If the list created by the transitive closure of step (1206) consists of at least two elements, the compiler (110) performs call site optimization by providing the list in the program code to a linker in conjunction with the call site (1214). Accordingly, the compiler optimizes call sites by providing a list of elements associated with the transitive closure of a function pointer to a linker.

Following steps (1210), (1212) and (1214) the remaining members of the COLA group are subject to further analysis. The members of the COLA group are analyzed to determine if a member in the COLA group has any other use(s) than a function call within the same module as the function symbol reference, a comparison to a member of COLA, a comparison to a NULL value, or if the member of the COLA group is externally assigned (1216). Any member found to have other use(s) or is externally assigned is removed from the COLA group. In one embodiment, due to the dynamic nature of the COLA group (e.g. varying membership), the process of step (1216) is performed iteratively until no members from the COLA group are removed during an iteration of the analysis (1218). Accordingly, additional members may be removed from the COLA group.

The function pointer constants assigned to a function pointer variable in the COLA group or compared with a function pointer variable in the COLA group are copied in order to ensure local assignment of the function pointer constant (1220). Copying is performed as the original function pointer constant may be used by an external module. Copying the function pointer constants enables any external module to use the original function pointer constant and the function pointers in the COLA group to use the copied function pointer constant. In this way, the copied function pointer constant cannot be initialized from an outside module. Following step (1220), it is determined whether the COLA member has already been designated local-use only (1222). If the response to the determination at step (1222) is negative, the compiler will proceed to designate in the program code that the non-call reference associated with that member is for local-entry-pointer-if-local-function (1224). If the response to the determination at step (1222) is positive, the optimization is concluded for that group member. Accordingly, members of the candidate set may have no optimization, have a function value optimized, a function site optimized or combinations thereof.

The process shown in FIGS. 2-12 demonstrate the function of the compiler, linker, and loader, and more specifically, the processes employed for resolving aspects of the user of the local entry point with an indirect function call. It is understood that these processes and the function of the compiler, linker, and loader are embedded in hardware of the underlying computer system. For example, the location holding a function pointer value could be a hardware register, memory location or other low-level location. In one embodiment a location holding a function pointer value could be a virtual register, a source language object, Static-Single Assignment (SSA) name, or other compiler generated location.

Figure 13:
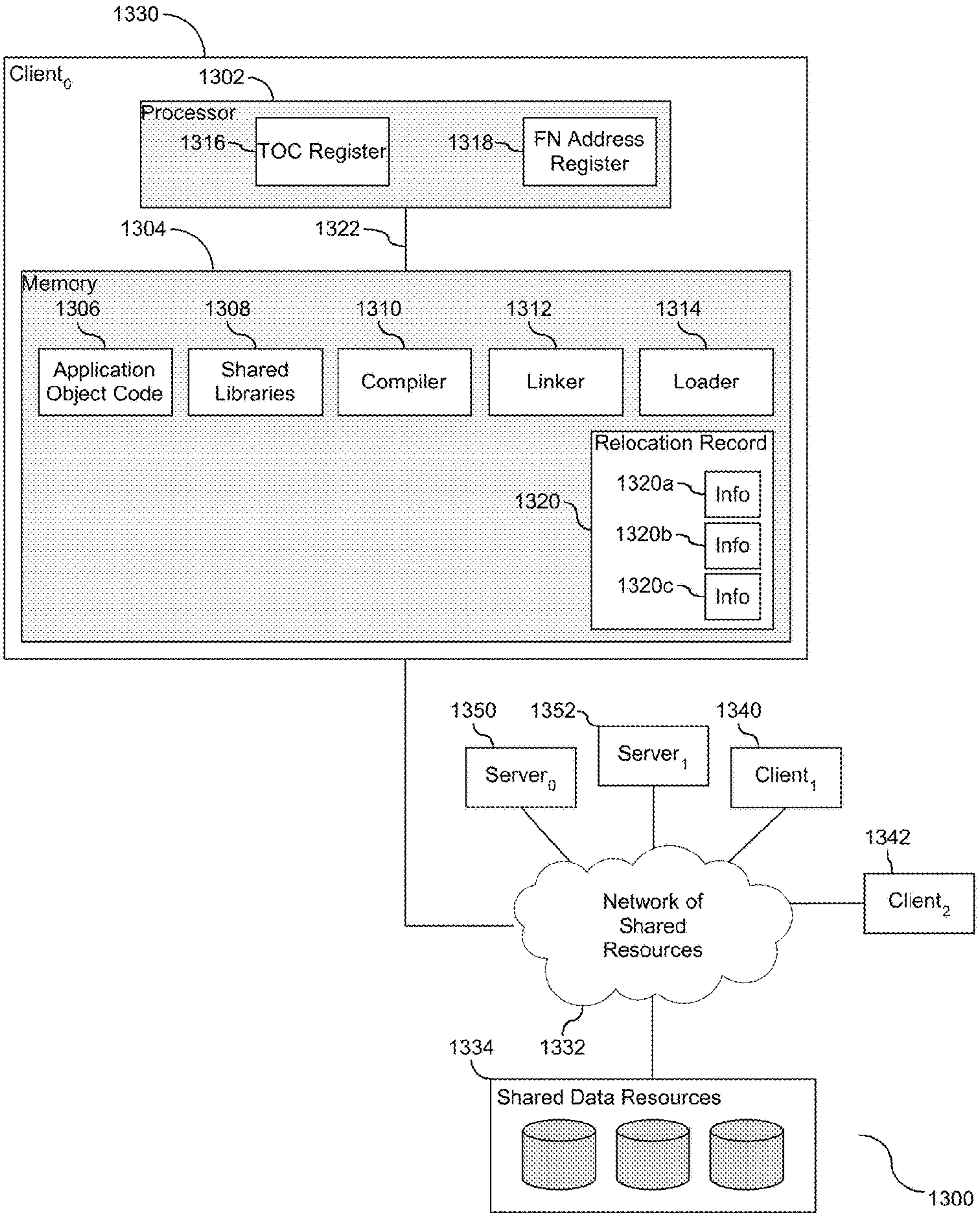
FIG. 13 depicts a schematic of an example system to implement the process shown and described in FIGS. 1 and 3-12.

Aspects of the use of the local entry point with an indirect function call shown and described in FIGS. 1 and 3-12, employ one or more tools to support use of the local entry point with an indirect function call. Referring to FIG. 13, a block diagram (1300) is provided illustrating a computer system that supports and enables the use of the local entry point with an indirect function call. A client machine, $client_0$ (1330) is shown configured with a processing unit (1302) in communication with a memory (1304) across a bus (1322), and in communication with a network of shared resources (1332) across a network connection to provide the $client_0$ (1330) with access to shared resources, including, but not limited to, shared data resources (1334), other client machines, $client_1$ (1340) and $client_2$ (1342), and servers, $server_0$ (1350) and $server_1$ (1352). Application object code (1306), which is generated from program source code (not shown) by a compiler, such as compiler (1310), comprises a plurality of functions, and is stored in memory (1304) for execution by processor (1302). The application object code (1306) may be generated by a compiler that is located on a different machine from client machine, $client_0$, (1330). A relocation record (1320), which is generated by a compiler, such as a compiler (1310), is stored in the application object code (1306) for review by the compiler (1310), linker (1312) or loader (1314). The linker (1312) may read the relocation record (1320) and if necessary generate another copy of the relocation into an executable or DSO file. The linker (1312) links the application object code (1306) before the application object code (1306) is executed by the loader (1314). Shared library (1308) comprises functions that are external to application object code (1306) and that may be called during execution of application object code (1306) via external function calls (i.e., calls to functions in other modules). Loader (1314) comprises runtime components and executes the application object code (706). The loader (1314) may inspect the relocation record present in the executable or DSO file while loading the file into a memory, such as main memory (1304).

TOC register (1316) is located in processor (1302). TOC register stores a current value of a TOC pointer for the currently active function of application object code (1306) or shared library (1308). Function address register (1318) is also located in processor (1302), and holds an address of currently executing functions. In some embodiments, the computer system (1300) may further comprise another object code module that is distinct from the application object code (1306) and the shared library (1308), and the other object code module may also contain functions that are called by application object code (1306) via external function calls.

The shared data resource, such as resource (1334) may be in the form of a storage array. The array is commonly configured with a storage controller to manage two or more storage devices The storage array can be one dimensional with a single category of storage devices, or in one embodiment multi-dimensional, also referred to herein as a tiered storage solution with multiple types of storage, e.g. persistent RAM, SSD, HDD, and Tape. More specifically, tiered storage directs data to a storage media within the storage array based on performance, availability, and recovery requirements.

Aspects of the functional tools, e.g. compiler (110), loader (112) and linker (114), and their associated functionality may be embodied in a computer system/server in a single location, or in one embodiment, may be configured in a cloud based system sharing computing resources. With references to FIG. 14, a block diagram (1400) is provided illustrating an example of a computer system/server (1402), hereinafter referred to as a host (1402) in communication with a cloud based support system, to implement the processes described above with respect to FIGS. 1 and 3-12. Host (1402) is operational with numerous other general purpose or special purpose computing system environments or configurations. Examples of well-known computing systems, environments, and/or configurations that may be suitable for use with host (1402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1402) may be described in the general context of computer system-executable instructions, such as program modules, being executed by a computer system. Generally, program modules may include routines, programs, objects, components, logic, data structures, and so on that perform particular tasks or implement particular abstract data types. Host (1402) may be practiced in distributed cloud computing environments where tasks are performed by remote processing devices that are linked through a communications network. In a distributed cloud computing environment, program modules may be located in both local and remote computer system storage media including memory storage devices.

Figure 14:
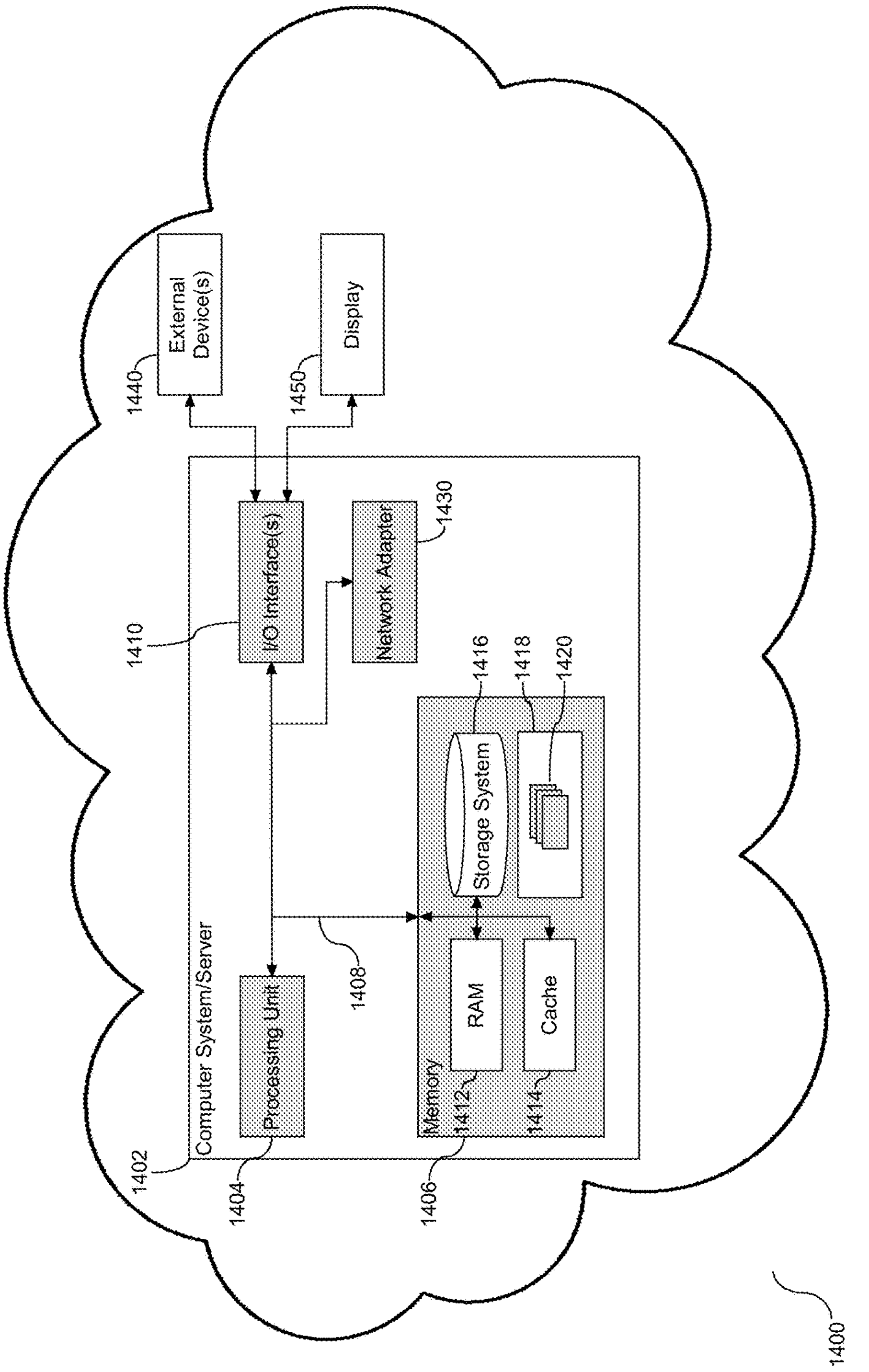
FIG. 14 is a block diagram illustrating an example of a computer system/server of a cloud based support system, to implement the process described above with respect to FIGS. 1 and 3-12.

As shown in FIG. 14, host (1402) is shown in the form of a general-purpose computing device. The components of host (1402) may include, but are not limited to, one or more processors or processing units (1404), a system memory (1406), and a bus (1408) that couples various system components including system memory (1406) to processor (1404). Bus (1408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1402) typically includes a variety of computer system readable media. Such media may be any available media that is accessible by host (1402) and it includes both volatile and non-volatile media, removable and non-removable media.

Memory (1406) can include computer system readable media in the form of volatile memory, such as random access memory (RAM) (1412) and/or cache memory (1414). By way of example only, storage system (1416) can be provided for reading from and writing to a non-removable, non-volatile magnetic media (not shown and typically called a “hard drive”). Although not shown, a magnetic disk drive for reading from and writing to a removable, non-volatile magnetic disk (e.g., a “floppy disk”), and an optical disk drive for reading from or writing to a removable, non-volatile optical disk such as a CD-ROM, DVD-ROM or other optical media can be provided. In such instances, each can be connected to bus (1408) by one or more data media interfaces.

Program/utility (1418), having a set (at least one) of program modules (1420), may be stored in memory (1406) by way of example, and not limitation, as well as an operating system, one or more application programs, other program modules, and program data. Each of the operating systems, one or more application programs, other program modules, and program data or some combination thereof, may include an implementation of a networking environment. Program modules (1420) generally carry out the functions and/or methodologies of embodiments to assign global and local entry points for a function call and optimize an indirect call site. For example, the set of program modules (1420) may include the modules configured to allow the use of the local entry point with an indirect function call and optimization of an indirect call site as described in FIGS. 1 and 3-12.

Host (1402) may also communicate with one or more external devices (1440), such as a keyboard, a pointing device, etc.; a display (1450); one or more devices that enable a user to interact with host (1402); and/or any devices (e.g., network card, modem, etc.) that enable host (1402) to communicate with one or more other computing devices. Such communication can occur via Input/Output (I/O) interface(s) (1410). Still yet, host (1402) can communicate with one or more networks such as a local area network (LAN), a general wide area network (WAN), and/or a public network (e.g., the Internet) via network adapter (1430). As depicted, network adapter (1430) communicates with the other components of host (1402) via bus (1408). In one embodiment, a plurality of nodes of a distributed file system (not shown) is in communication with the host (1402) via the I/O interface (1410) or via the network adapter (1430). It should be understood that although not shown, other hardware and/or software components could be used in conjunction with host (1402). Examples, include, but are not limited to: microcode, device drivers, redundant processing units, external disk drive arrays, RAID systems, tape drives, and data archival storage systems, etc.

In this document, the terms “computer program medium,” “computer usable medium,” and “computer readable medium” are used to generally refer to media such as main memory (1406), including RAM (1412), cache (1414), and storage system (1416), such as a removable storage drive and a hard disk installed in a hard disk drive.

Computer programs (also called computer control logic) are stored in memory (1406). Computer programs may also be received via a communication interface, such as network adapter (1430). Such computer programs, when run, enable the computer system to perform the features of the present embodiments as discussed herein. In particular, the computer programs, when run, enable the processing unit (1404) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (1402) is a node (1460) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 15:
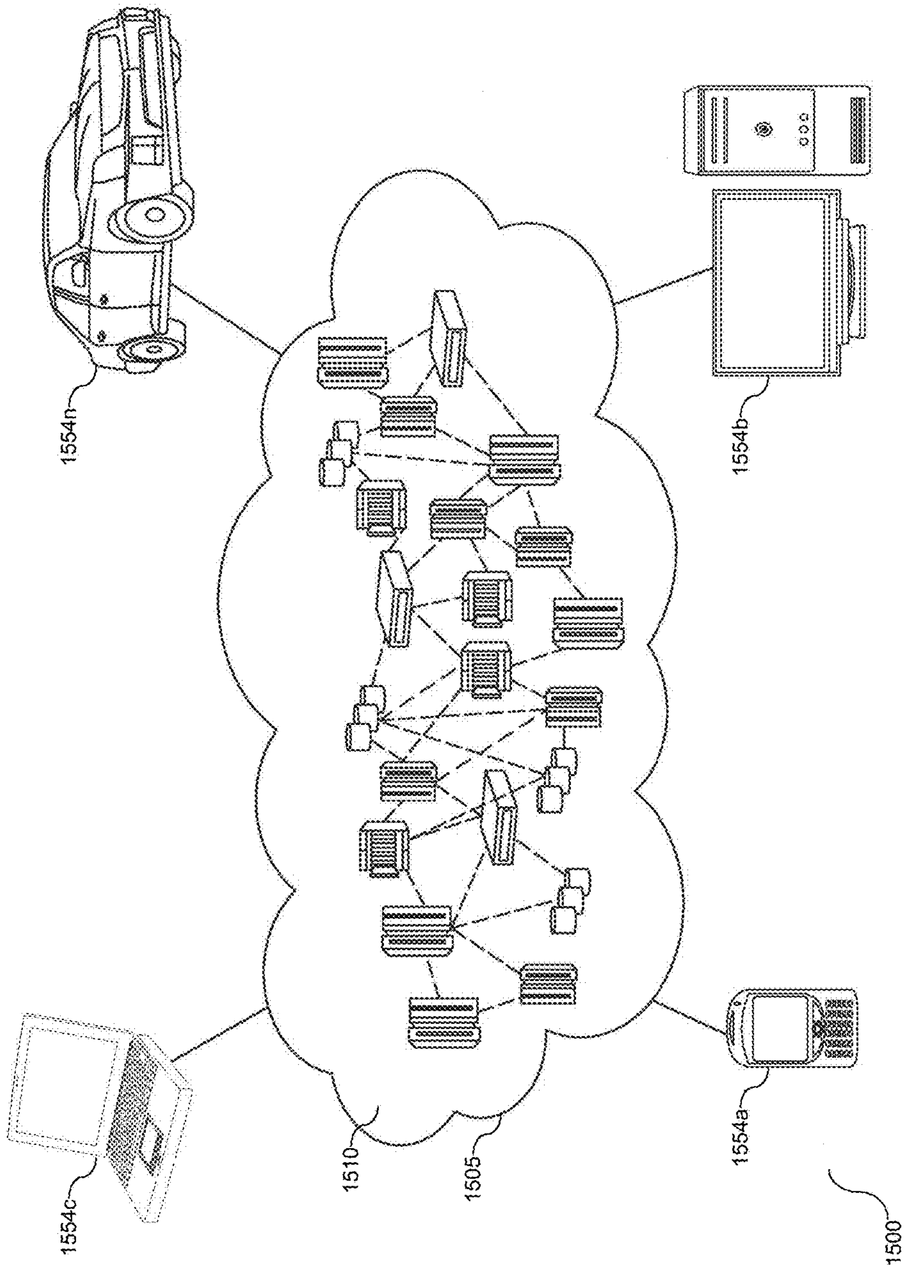
FIG. 15 depicts a block diagram illustrating a cloud computer environment.

Referring now to FIG. 15, an illustrative cloud computing network (1500). As shown, cloud computing network (1500) includes a cloud computing environment (1505) having one or more cloud computing nodes (1510) with which local computing devices used by cloud consumers may communicate. Examples of these local computing devices include, but are not limited to, personal digital assistant (PDA) or cellular telephone (1554A), desktop computer (1554B), laptop computer (1554C), and/or automobile computer system (1554N). Individual nodes within nodes (1510) may further communicate with one another. They may be grouped (not shown) physically or virtually, in one or more networks, such as Private, Community, Public, or Hybrid clouds as described hereinabove, or a combination thereof. This allows cloud computing environment (1500) to offer infrastructure, platforms and/or software as services for which a cloud consumer does not need to maintain resources on a local computing device. It is understood that the types of computing devices (1554A)-(1554N) shown in FIG. 15 are intended to be illustrative only and that the cloud computing environment (1505) can communicate with any type of computerized device over any type of network and/or network addressable connection (e.g., using a web browser).

Figure 16:
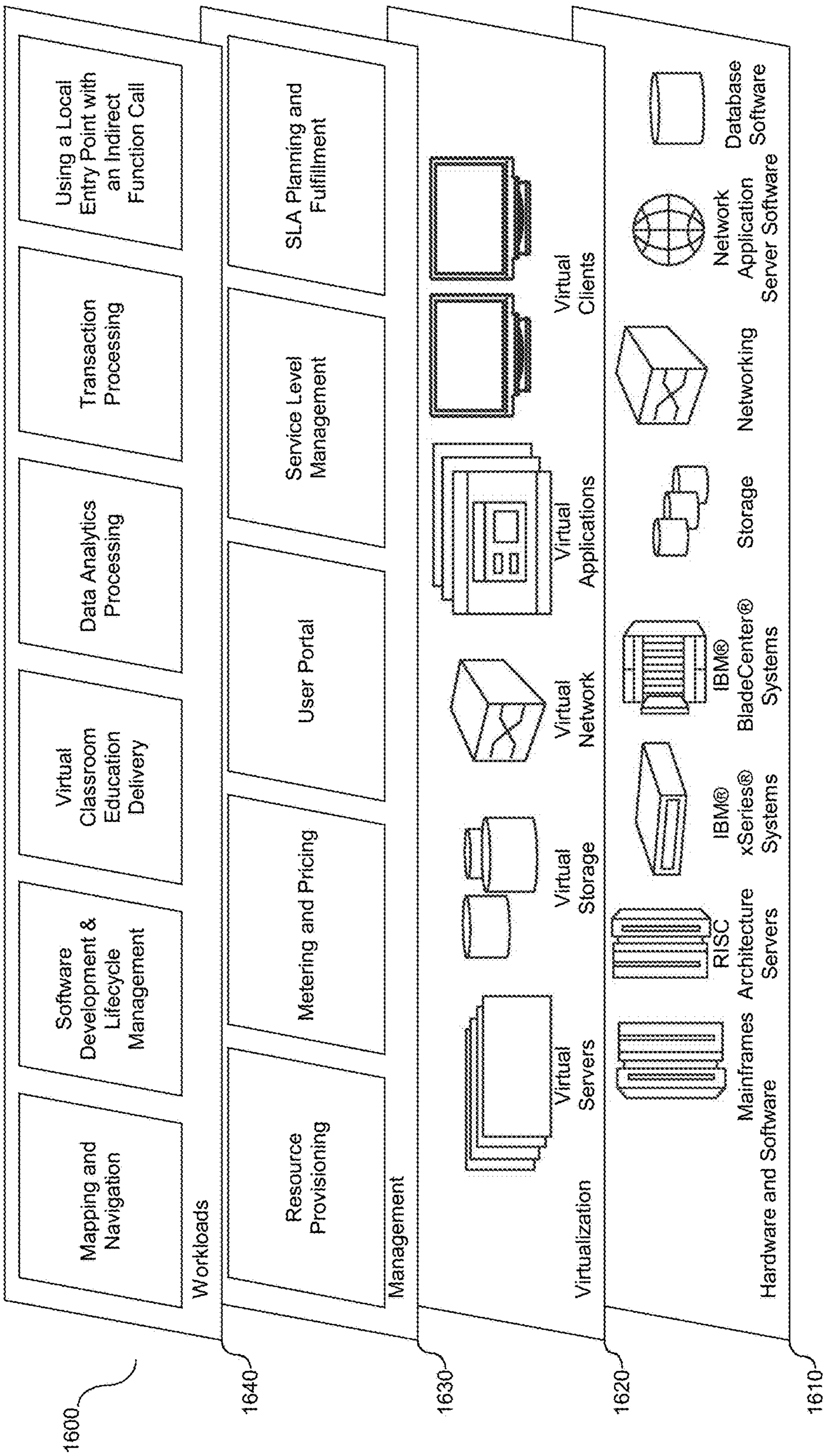
FIG. 16 depicts a block diagram illustrating a set of functional abstraction model layers provided by the cloud computing environment.

Referring now to FIG. 16, a set of functional abstraction layers provided by the cloud computing network of FIG. 15 is shown. It should be understood in advance that the components, layers, and functions shown in FIG. 16 are intended to be illustrative only, and the embodiments are not limited thereto. As depicted, the following layers and corresponding functions are provided: hardware and software layer (1610), virtualization layer (1620), management layer (1630), and workload layer (1640). The hardware and software layer (1610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1620) provides an abstraction layer from which the following examples of virtual entities may be provided: virtual servers; virtual storage; virtual networks, including virtual private networks; virtual applications and operating systems; and virtual clients.

In one example, management layer (1630) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA.

Workloads layer (1640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and using a local entry point with an indirect function call.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed.

Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of determining which entry points can be used in computer systems provides a way to use local entry points with an indirect call function.

It will be appreciated that, although specific embodiments have been described herein for purposes of illustration, various modifications may be made without departing from the spirit and scope of the embodiments. In particular, the compiler, linker and loader can be located on a different computer system than the application object code. In a further embodiment, the loader is dynamic. In a further embodiment, the linker is static. In another embodiment, the linker is dynamic. Accordingly, the scope of protection of these embodiments is limited only by the following claims and their equivalents.

What is claimed is:

1. A method comprising:

configuring an indirect function call configuration, the configuration including a first application module defined with a target function of an indirect function call, a second application module with a symbolic reference to the target function of the indirect function call, and a third application module to originate the indirect function call; and executing program code from an application module loaded into memory, the application module selected from the group consisting of: the first application module, the second application module, the third application module and a fourth application module;

the executing including:

loading the address of a function, the address selected from the group consisting of: a local entry point address of a function defined in the loaded application module and a global entry point address;

transferring execution to the entry point address, including skipping a program instruction selected from the group consisting of: loading a table of contents pointer register and restoring a table of contents pointer register;

performing an indirect function call using the address of the function, the performing the indirect function call further comprising transferring execution to an entry point address, the address selected from the group consisting of: the local entry point address of a function defined in the application module and the global entry point address;

the performing including skipping a program instruction, the program instruction selected from the group consisting of: loading a table of contents pointer register and restoring a table of contents pointer register.

2. The method of claim 1, further comprising:

determining the address of the function is a potential target function of the indirect function call.

3. The method of claim 2, further comprising:

indicating that the address of the function is a potential target function.

4. The method of claim 3, further comprising:

determining that the program code indicates a potential target function; and determining that the potential target function is defined in the application module.

5. The method of claim 1, further comprising:

determining that the address of the function is used exclusively to perform indirect function calls in the application module.

6. The method of claim 5, further comprising:

indicating that the address of the function is used exclusively to perform indirect function calls in the application module.

7. The method of claim 6, further comprising:

determining that the symbolic reference can be resolved using a local entry point address of the function;

determining that the function that the symbolic reference refers to is defined in the application module.

8. The method of claim 7, wherein the entry point address is the local entry point address.

* * * * *